United States Patent
Choi et al.

(10) Patent No.: US 11,165,061 B2
(45) Date of Patent: Nov. 2, 2021

(54) METHOD OF PREPARING POSITIVE ELECTRODE ACTIVE MATERIAL FOR LITHIUM SECONDARY BATTERY AND POSITIVE ELECTRODE ACTIVE MATERIAL FOR LITHIUM SECONDARY BATTERY PREPARED THEREBY

(71) Applicant: ECOPRO BM CO., LTD., Cheongju-si (KR)

(72) Inventors: Moon Ho Choi, Cheongju-si (KR); Jong Seung Shin, Cheongju-si (KR); Suk Yong Jeon, Cheongju-si (KR); Hyun Jong Yu, Cheongju-si (KR); Young Nam Park, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 0 days.

(21) Appl. No.: 16/086,563

(22) PCT Filed: Mar. 27, 2017

(86) PCT No.: PCT/KR2017/003265
§ 371 (c)(1),
(2) Date: Sep. 19, 2018

(87) PCT Pub. No.: WO2017/164718
PCT Pub. Date: Sep. 28, 2017

(65) Prior Publication Data
US 2019/0123350 A1    Apr. 25, 2019

(30) Foreign Application Priority Data

Mar. 25, 2016  (KR) .................. 10-2016-0035922
May 4, 2016    (KR) .................. 10-2016-0055094

(51) Int. Cl.
| | | |
|---|---|---|
| *H01M 4/131* | (2010.01) | |
| *H01M 4/36* | (2006.01) | |
| *H01M 4/505* | (2010.01) | |
| *H01M 4/525* | (2010.01) | |
| *H01M 4/02* | (2006.01) | |
| *H01M 10/0525* | (2010.01) | |
| *C01G 53/00* | (2006.01) | |
| *C01G 53/04* | (2006.01) | |

(52) U.S. Cl.
CPC .......... *H01M 4/525* (2013.01); *C01G 53/006* (2013.01); *C01G 53/04* (2013.01); *C01G 53/42* (2013.01); *C01G 53/44* (2013.01); *C01G 53/50* (2013.01); *C01G 53/70* (2013.01); *H01M 4/366* (2013.01); *H01M 4/505* (2013.01); *H01M 10/0525* (2013.01); *C01P 2002/52* (2013.01); *C01P 2002/72* (2013.01); *H01M 2004/028* (2013.01)

(58) Field of Classification Search
CPC ........ H01B 1/08; H01M 4/131; H01M 4/364; H01M 4/366; H01M 4/505; H01M 4/525; H01M 10/0525; H01M 2004/028; C01G 53/006; C01G 53/04; C01G 53/42; C01G 53/44; C01G 53/50; C01G 53/66; C01G 53/70

See application file for complete search history.

(56) References Cited

U.S. PATENT DOCUMENTS

| | | | | |
|---|---|---|---|---|
| 7,294,435 B2* | 11/2007 | Miyamoto | ........ | H01M 10/0525 429/231.1 |
| 8,066,913 B2* | 11/2011 | Kikuya | ................ | H01M 4/131 252/518.1 |
| 8,492,030 B2* | 7/2013 | Park | ..................... | C01G 45/006 423/594.15 |
| 8,865,348 B2* | 10/2014 | Sun | ........................ | H01M 4/131 429/223 |
| 2012/0104311 A1* | 5/2012 | Levasseur | .............. | C01G 51/42 252/182.1 |
| 2014/0087262 A1* | 3/2014 | Imahashi | .............. | H01M 4/505 429/223 |
| 2015/0194662 A1* | 7/2015 | Yang | ..................... | H01M 4/131 429/223 |
| 2015/0280211 A1* | 10/2015 | Kikuya | ................ | H01M 4/505 429/223 |
| 2015/0349336 A1* | 12/2015 | Yokoyama | ............ | H01M 4/366 429/223 |

(Continued)

FOREIGN PATENT DOCUMENTS

| | | | | |
|---|---|---|---|---|
| JP | 5055702 B2 | 10/2012 | | |
| JP | 2012-230898 A | 11/2012 | | |
| JP | 2012230898 A * | 11/2012 | ............ | H01M 4/505 |

(Continued)

OTHER PUBLICATIONS

International Search Report in International Application No. PCT/KR2017/003265, filed Mar. 27, 2017.

*Primary Examiner* — Matthew R Diaz
(74) *Attorney, Agent, or Firm* — Saliwanchik, Lloyd & Eisenschenk

(57) ABSTRACT

The present invention relates to a method of preparing a positive electrode active material for a lithium secondary battery and the positive electrode active material for the lithium secondary battery prepared thereby, and more specifically, to a method of preparing a positive electrode active material for a lithium secondary battery, the method comprising doping or coating the positive electrode active material for the lithium secondary battery with a predetermined metal oxide, and the positive electrode active material for the lithium secondary battery which is prepared thereby and has a reduced amount of residual lithium.

13 Claims, 15 Drawing Sheets

(56) References Cited

U.S. PATENT DOCUMENTS

2016/0099464 A1* 4/2016 Takei ................. H01M 10/052
                                                                    429/220

FOREIGN PATENT DOCUMENTS

| JP | 2016-006762 A | | 1/2016 | |
|----|---------------|---|--------|---|
| JP | 2016006762 A | * | 1/2016 | ............ H01M 4/505 |
| KR | 10-2005-0048453 A | | 5/2005 | |
| KR | 10-2014-0093529 A | | 7/2014 | |

* cited by examiner

METHOD OF PREPARING POSITIVE ELECTRODE ACTIVE MATERIAL FOR LITHIUM SECONDARY BATTERY AND POSITIVE ELECTRODE ACTIVE MATERIAL FOR LITHIUM SECONDARY BATTERY PREPARED THEREBY

CROSS-REFERENCE TO RELATED APPLICATIONS

This application is the U.S. national stage application of International Patent Application No. PCT/KR2017/003265, filed Mar. 27, 2017, which claims the benefit under 35 U.S.C. § 119 of Korean Application Nos. 10-2016-0035922, filed Mar. 25, 2016, and 10-2016-0055094, filed May 4, 2016, the disclosures of each of which are incorporated herein by reference in their entirety.

BACKGROUND OF THE INVENTION

Field of the Invention

The present invention relates to a method of preparing a positive electrode active material for a lithium secondary battery and the positive electrode active material for the lithium secondary battery prepared thereby, and more specifically, to a method of preparing a positive electrode active material for a lithium secondary battery, the method comprising doping or coating the positive electrode active material for the lithium secondary battery with a predetermined metal oxide, and the positive electrode active material for the lithium secondary battery which is prepared thereby and has a reduced amount of residual lithium.

Related Art

As a technology and a demand for a mobile device increase, a demand for secondary batteries as an energy source is being rapidly increased. A lithium secondary battery among the secondary batteries which exhibits a high energy density and an action potential and has a long cycle lifetime and a low self-discharge rate has been commercialized and widely used.

A lithium-containing cobalt oxide ($LiCoO_2$) has been mainly used as the positive electrode active material for the lithium secondary battery. Further, using a lithium-containing manganese oxide such as $LiMnO_2$ of a layered crystal structure, $LiMn_2O_4$ of a spinel crystal structure or the like, and a lithium-containing nickel oxide such as $LiNiO_2$ has also been considered.

Although $LiCoO_2$ among the positive electrode active materials has most frequently been used since $LiCoO_2$ is excellent in lifetime characteristics and charging and discharging efficiency, there is a disadvantage that $LiCoO_2$ has limited price competitiveness when a large amount of $LiCoO_2$ is used for a power source of a middle- to large-sized battery field such as an electric vehicle or the like since $LiCoO_2$ has a small capacity and is expensive due to resource limitation of cobalt. Lithium manganese oxides such as $LiMnO_2$, $LiMn_2O_4$ and the like have advantages that the lithium manganese oxides are eco-friendly, have excellent thermal stability, and are inexpensive since a manganese resource used as a raw material for the lithium manganese oxides is abundant. However, the lithium manganese oxides have problems of small capacities, and deteriorating high temperature characteristics and cycle properties.

In order to supplement such drawbacks, a demand for a Ni rich system as a positive electrode active material for a secondary battery has begun to increase. However, the Ni rich system as the active material has an excellent advantage of exhibiting high capacity, whereas the Ni rich system as the active material has problems that a swelling phenomenon is caused by a high content of residual unreacted lithium, and a gas is generated by a reaction with an electrolyte.

A method of producing a lithium composite oxide generally comprises the steps of preparing a transition metal precursor, mixing the transition metal precursor with a lithium compound to obtain a mixture, and firing the mixture. At this time, the lithium compound includes LiOH and/or $Li_2CO_3$. In general, $Li_2CO_3$ is used when the positive electrode active material has an Ni content of 65% or less, and it is preferable that LiOH is used since it is a low temperature reaction when the positive electrode active material has an Ni content of 65% or more. However, the Ni rich system has a problem that the positive electrode active material has a high content of residual lithium existing in the form of LiOH and $Li_2CO_3$ in the surface thereof since a Ni rich system having a Ni content of 65% or more is a low temperature reaction.

Such residual lithium, i.e., unreacted LiOH and $Li_2CO_3$ are made to react with an electrolyte and the like within a battery to cause the generation of gas or swelling phenomenon, thereby causing a problem of severely deteriorating high temperature stability. Further, the unreacted LiOH may cause gelation of the slurry since the unreacted LiOH has a high viscosity during mixing of a slurry before manufacturing electrode plates.

In general, a washing process is introduced to remove such an unreacted Li. However, when the washing process is introduced to wash the positive electrode active material, the surface of the positive electrode active material is damaged to cause another problems that capacity and rate capability are deteriorated, and resistance is increased during high temperature storage.

SUMMARY OF THE INVENTION

In order to solve the above-described problems associated with prior art, the present invention provides a method of preparing a new positive electrode active material for a lithium secondary battery, the method which is capable of improving capacity and rate properties while removing the unreacted lithium.

The present invention also provides the positive electrode active material for the lithium secondary battery, the positive electrode active material which is prepared by the method of the present invention.

In order for the present invention to solve the aforementioned problems, in an aspect, a method of producing a lithium nickel composite oxide represented by the following chemical formula 2 is provided. The method comprises the steps of:
i) producing a compound of nickel composite hydroxide represented by the following chemical formula 1;

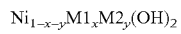    [Chemical Formula 1]

(M1 is one or more elements selected from the group consisting of Co and Mn,

M2 is one or more elements selected from the group consisting of Al, Mn, Mg, Si, P and Ga, 0≤a≤0.3, 0≤x≤0.03, and 0≤y≤0.03)

ii) washing the compound obtained in the step i) by adding to a washing solution;

iii) drying the compound washed in the step ii);

iv) mixing the compound dried in the step iii) with a lithium compound and a compound including M3 (M3 is one or more elements selected from the group consisting of Al, B, Ba, Mg, Ce, Cr, F, Li, Mo, P, Sr, Ti and Zr, and M1, M2 and M3 are not all equal); and v) heating the compound mixed in the step iv)

$$Li_{1+a}Ni_{1-x-y}M1_xM2_yM3_zO_2$$ [Chemical Formula 2]

In chemical formula 2, M1 is one or more elements selected from the group consisting of Co and Mn, M2 is one or more elements selected from the group consisting of Al, Mn, Mg, Si, P and Ga, 0≤a≤0.3, 0≤x≤0.03, 0≤y≤0.03, and 0≤z≤0.03.

In the method of the present invention, the washing solution of the step ii) may include one or more selected from the group consisting of distilled water, methanol, ethanol, 2-propanol, 1-butanol, ethylene glycol, polyvinyl alcohol (PVA), acetone, acetyl acetone, benzophenone, NaOH, NH$_4$OH, LiOH, KOH, Mg(OH)$_2$, and Ba(OH)$_2$.

In the method of the present invention, the step iii), i.e., the step of drying the compound washed in the step ii) may include drying the washed compound at 50 to 300° C. in a depressurized atmosphere.

In the method of the present invention, the compound including the M3 has a particle diameter of 5 μm or less in the step iv) of mixing particles of the compound dried in the step iii), the lithium compound and the metal oxide including M3.

In the method of the present invention, the M3 is cerium, and the compound including the M3 is CeO$_2$.

In the method of the present invention, the M3 is Mg, and the compound including the M3 is (Mg(OH)$_2$.

In the method of the present invention, 0.001 to 10 parts by weight of the metal oxide including M3 is mixed with 100 parts by weight of the particles of the compound dried in the step iii) in the step iv) of mixing the particles of the compound dried in the step iii), the lithium compound and the compound including M3.

The method of the present invention further may comprise a step (vi) of washing the compound heated in the step v) by adding to a washing solution. At this time, the washing solution used in the step vi) may be preferably a washing solution that is the same as the washing solution of the step ii). Specifically, the washing solution may include one or more selected from the group consisting of methanol, ethanol, 2-propanol, 1-butanol, ethylene glycol, polyvinyl alcohol (PVA), acetone, acetyl acetone, benzophenone, NaOH, NH$_4$OH, LiOH, KOH, Mg(OH)$_2$, and Ba(OH)$_2$.

It is possible that the method of the present invention further comprises: after performing the above-mentioned washing step vi), a step vii) of mixing a lithium nickel composite oxide represented by the above-mentioned chemical formula 2 with a surface coating compound including M4 (M4 like M3 is one or more elements selected from the group consisting of Al, B, Ba, Mg, Ce, Cr, F, Li, Mo, P, Sr, Ti and Zr); and a step viii) of performing a heat treatment process.

In the method of the present invention, the surface coating compound including M4 has a particle diameter of 5 μm or less.

In the method of the present invention, the M4 is Mg, and the surface coating compound including M4 is (Mg(OH)$_2$.

In the method of the present invention, the M4 may be Ce, and the surface coating metal oxide including M4 may be CeO$_2$.

In other aspect, a lithium nickel composite oxide produced by the method of the present invention is provided.

The lithium nickel composite oxide produced by the method of the present invention may be characterized in that peaks are detected within 2θ ranges of 28° to 29°, 45° to 50° and 55° to 60° in the X-ray diffraction (XRD).

In another aspect, a lithium secondary battery including the lithium nickel composite oxide produced by the method of the present invention is provided.

DESCRIPTION OF EXEMPLARY EMBODIMENTS

Figure 1A:
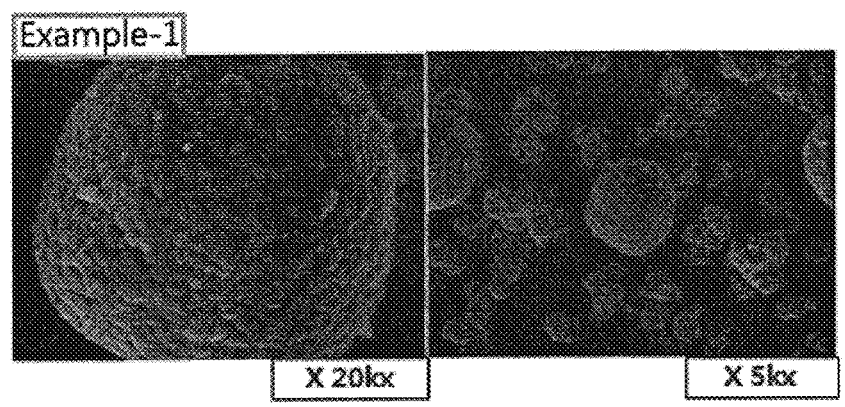
FIGS. 1(a) to 1(e) and FIGS. 2(a) to 2(b) show results of measuring scanning electron microscope (SEM) photographs of active materials prepared in Examples and Comparative Examples of the present invention.
Figure 1B:
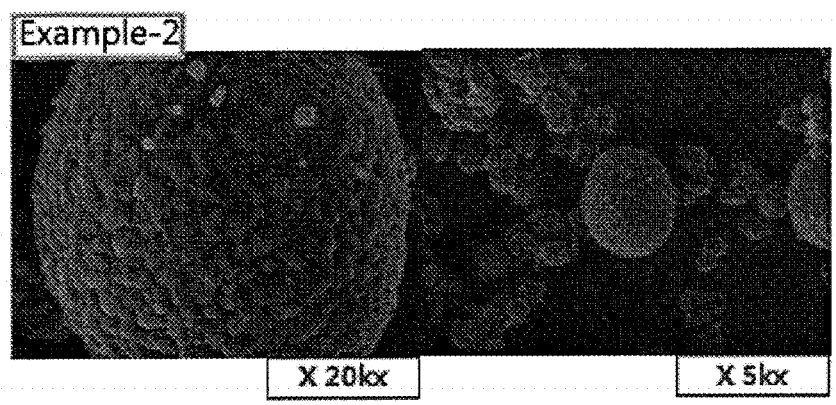
Figure 1C:
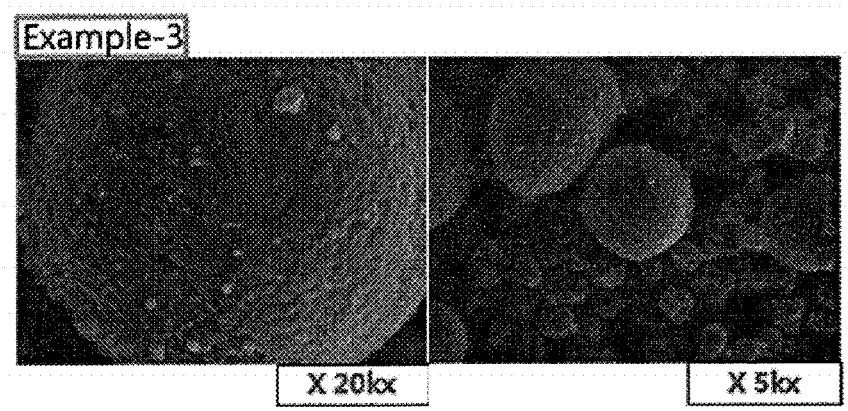
Figure 1D:
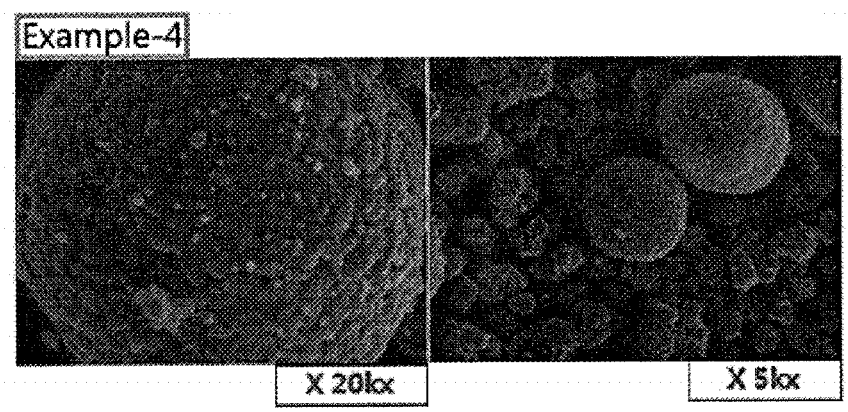
Figure 1E:
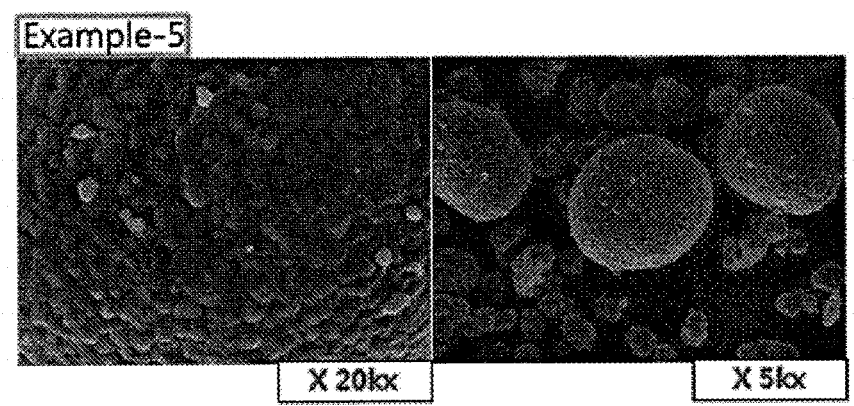
Figure 2A:
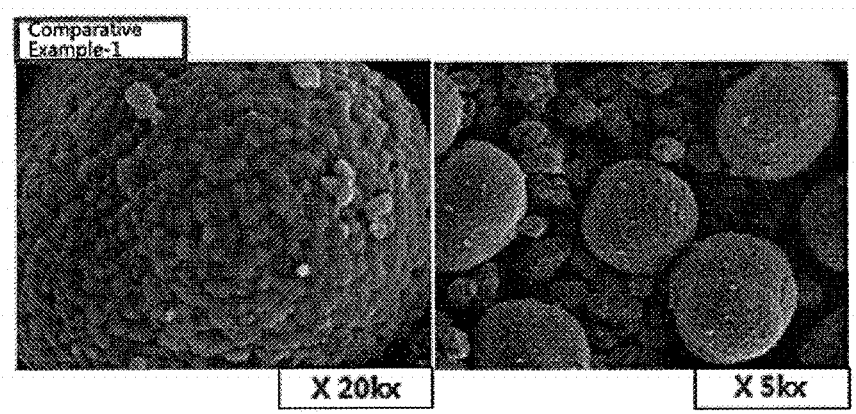
Figure 2B:
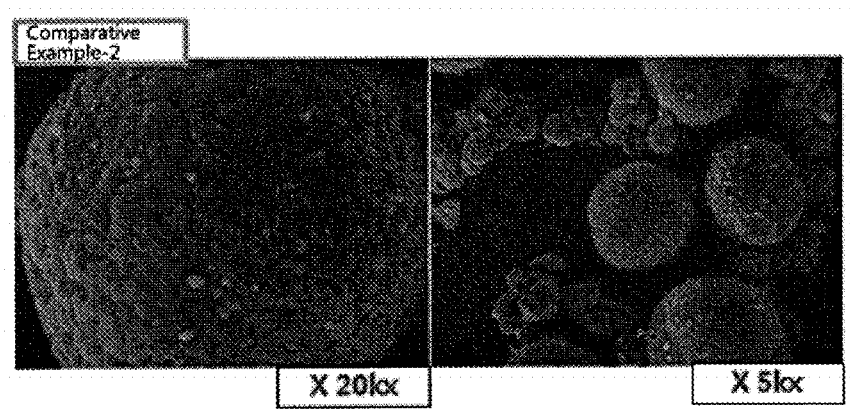

Hereinafter, the present invention will be described more in detail by embodiments. However, the present invention is not limited to the following embodiments.

Example 1

Preparation of a Positive Electrode Active Material

In order to prepare an NCA positive electrode active material, a precursor represented by NiCoAl(OH)$_2$ was produced in advance by a coprecipitation reaction.

A positive electrode active material for a lithium secondary battery was prepared by adding LiOH as a lithium compound and 1.4 mole of Al$_2$O$_3$ and 0.125 mole of Mg(OH)$_2$ as compounds including a dopant M3 to the produced precursor, and heat-treating a mixture of the lithium compound, the compounds including the dopant M3 and the precursor.

After preparing distilled water and constantly maintaining temperature of the distilled water, the prepared positive electrode active material for the lithium secondary battery was injected into the distilled water to wash the positive electrode active material for the lithium secondary battery with the distilled water while maintaining temperature of the distilled water.

After mixing the washed positive electrode active material with 0.005 mole of $CeO_2$ as a M4-containing compound for coating to obtain a mixture, the mixture was heat-treated at a second temperature.

Examples 2 to 4

Positive electrode active materials of Examples 2 to 4 were prepared in the same manner as in Example 1 except that $CeO_2$ as the M4-containing compound for coating was added at a mixing ratio as shown in the following Table 1.

TABLE 1

| Classification | M3, mol % | | | | M4, mol % | |
|---|---|---|---|---|---|---|
| | Al | Mg | Ce | Ti | Ce | Ti |
| Example-1 | 1.4 | 0.125 | | | 0.05 | |
| Example-2 | 1.4 | 0.125 | | | 0.1 | |
| Example-3 | 1.4 | 0.125 | | | 0.25 | |
| Example-4 | 1.4 | 0.125 | | | 0.5 | |
| Example-5 | 1.4 | 0.125 | 0.05 | | | |
| Example-6 | 1.4 | 0.125 | 0.05 | | | 0.05 |
| Example-7 | 1.4 | 0.125 | 0.05 | | 0.05 | |
| Comparative Example-1 | 1.4 | 0.125 | | | | |
| Comparative Example-2 | 1.4 | 0.125 | | 0.1 | | |

Example 5

A precursor represented by $NiCoAl(OH)_2$ was produced by the coprecipitation reaction.

A positive electrode active material for a lithium secondary battery was prepared by adding LiOH as the lithium compound and 1.4 mole of $Al_2O_3$, 0.125 mole of $Mg(OH)_2$ and 0.05 mole of $CeO_2$ as the compounds including the dopant M3 to the produced precursor, and heat-treating a mixture of the lithium compound, the compounds including the dopant M3 and the precursor.

After preparing distilled water and constantly maintaining temperature of the distilled water, the prepared positive electrode active material for the lithium secondary battery was injected into the distilled water to wash the positive electrode active material for the lithium secondary battery with the distilled water while maintaining temperature of the distilled water.

Thereafter, a positive electrode active material of Example 5 was prepared by heat-treating the washed positive electrode active material at a second temperature.

Example 6

A precursor represented by $NiCoAl(OH)_2$ was produced by the coprecipitation reaction.

A positive electrode active material for a lithium secondary battery was prepared by adding LiOH as the lithium compound and 1.4 mole of $Al_2O_3$, 0.125 mole of $Mg(OH)_2$ and 0.05 mole of $CeO_2$ as the compounds including the dopant M3 to the produced precursor, and heat-treating a mixture of the lithium compound, the compounds including the dopant M3 and the precursor.

After preparing distilled water and constantly maintaining temperature of the distilled water, the prepared positive electrode active material for the lithium secondary battery was injected into the distilled water to wash the positive electrode active material for the lithium secondary battery with the distilled water while maintaining temperature of the distilled water.

After mixing the washed positive electrode active material with 0.005 mole of $TiO_2$ as the M4-containing compound for coating to obtain a mixture, the mixture was heat-treated at a second temperature.

Example 7

A precursor represented by $NiCoAl(OH)_2$ was produced by the coprecipitation reaction.

A positive electrode active material for a lithium secondary battery was prepared by adding LiOH as the lithium compound and 1.4 mole of $Al_2O_3$, 0.125 mole of $Mg(OH)_2$ and 0.05 mole of $CeO_2$ as the compounds including the dopant M3 to the produced precursor, and heat-treating a mixture of the lithium compound, the compounds including the dopant M3 and the precursor.

After preparing distilled water and constantly maintaining temperature of the distilled water, the prepared positive electrode active material for the lithium secondary battery was injected into the distilled water to wash the positive electrode active material for the lithium secondary battery with the distilled water while maintaining temperature of the distilled water.

After mixing the washed positive electrode active material with 0.005 mole of $CeO_2$ as the M4-containing compound for coating to obtain a mixture, the mixture was heat-treated at a second temperature.

Comparative Example 1

A precursor represented by $NiCoAl(OH)_2$ was produced by the coprecipitation reaction. A positive electrode active material for a lithium secondary battery was prepared by adding LiOH as a lithium compound and 1.4 mole of $Al_2O_3$ and 0.125 mole of $Mg(OH)_2$ as the compounds including the dopant M3 to the produced precursor, and heat-treating a mixture of the lithium compound, the compounds including the dopant M3 and the precursor. After preparing distilled water and constantly maintaining temperature of the distilled water, the prepared positive electrode active material for the lithium secondary battery was injected into the distilled water to wash the positive electrode active material for the lithium secondary battery with the distilled water while maintaining temperature of the distilled water. Thereafter, a positive electrode active material of Comparative Example 1 was prepared by heat-treating the washed positive electrode active material at a second temperature.

Comparative Example 2

A precursor represented by $NiCoAl(OH)_2$ was produced by the coprecipitation reaction. A positive electrode active material for a lithium secondary battery was prepared by adding LiOH as the lithium compound and 1.4 mole of $Al_2O_3$, 0.125 mole of $Mg(OH)_2$ and 0.1 mole of $TiO_2$ as the compounds including the dopant M3 to the produced precursor, and heat-treating a mixture of the lithium compound, the compounds including the dopant M3 and the precursor.

After preparing distilled water and constantly maintaining temperature of the distilled water, the prepared positive electrode active material for the lithium secondary battery was injected into the distilled water to wash the positive electrode active material for the lithium secondary battery with the distilled water while maintaining temperature of the distilled water. Thereafter, a positive electrode active material of Comparative Example 2 was prepared by heat-treating the washed positive electrode active material at a second temperature.

Experimental Example

Measurement of SEM Photographs

SEM photographs of the positive electrode active materials prepared in Examples 1 to 5 and Comparative Examples 1 and 2 are measured and shown in FIGS. 1(a) to 1(e) and FIGS. 2(a) to 2(b).

Experimental Example

Measurement of XRD

Figure 3:
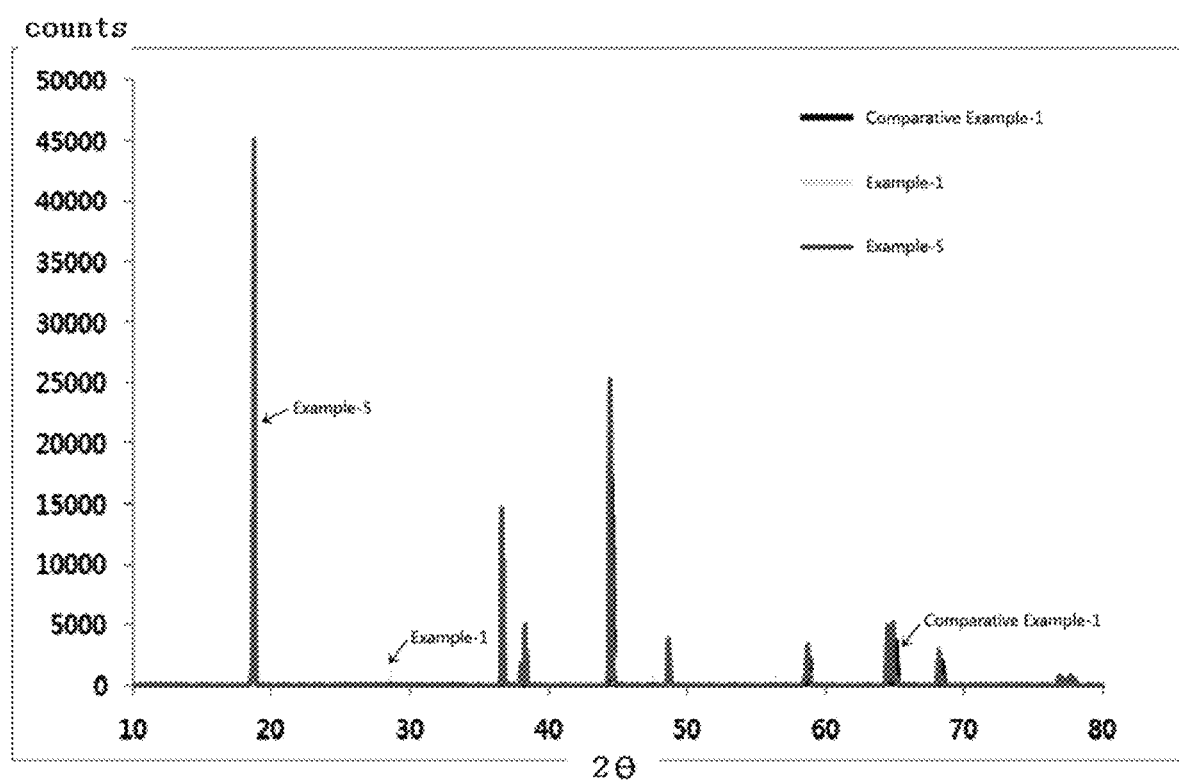
FIG. 3 and FIG. 4 show results of measuring X-ray diffractions (XRD) of active materials prepared in Examples and Comparative Example of the present invention.
Figure 4:
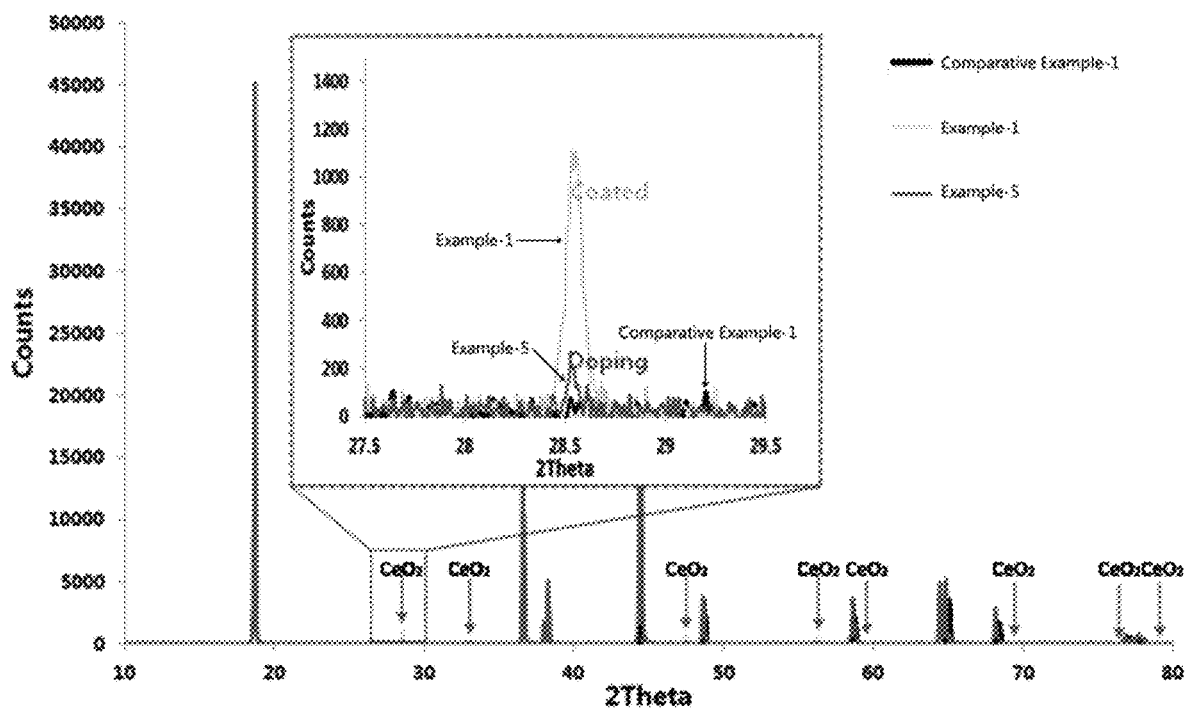

X-ray diffractions (XRD) of the positive electrode active materials prepared in Examples 1 to 5 and Comparative Examples 1 and 2 are measured and shown in FIG. 3 and FIG. 4.

In case of the positive electrode active materials prepared by Examples of the present invention in FIG. 3 and FIG. 4, it can be seen that distinguishing peaks are detected in 2θ ranges of 28° to 29°, 45° to 50° and 55° to 60°, and higher intensities of peaks detected are measured when injecting $CeO_2$ after firing than when simultaneously injecting a lithium source and CeO2 particularly in the 2θ range of 28° to 29°.

Experimental Example

Measurement of Residual Lithium

After measuring residual lithium amounts of lithium-nickel composite oxides produced in Examples and Comparative Examples, results of measuring the residual lithium amounts are shown in Table 2.

To measure residual lithium amounts, after immersing 1 g of the active materials in 5 g of distilled water, stirring the active materials in the distilled water for 5 minutes to obtain a mixture, and filtering the mixture to produce a filtrate, the filtrate was taken and titrated with 0.1 M HCl. The residual lithium amounts of the active materials were analyzed by measuring volumes of HCl injected until pH values of the filtrates became 4.

It can be confirmed that the residual lithium amounts are greatly reduced when cerium is doped by Examples of the present invention compared to Comparative Example-1 of doping Mg only.

TABLE 2

| No | Residual lithium, ppm LiOH | Residual lithium, ppm $Li_2CO_3$ | Discharge capacity (0.1 C) | Lifetime retention rate, % | DSC peak, °C. | After storage Imp., ohm |
|---|---|---|---|---|---|---|
| Example-1 | 782 | 1,123 | 215 | 76.6 | 236.8 | 13.9 |
| Example-2 | 927 | 1,183 | 215 | 77.7 | 236.2 | 17.2 |
| Example-3 | 1,401 | 1,885 | 215 | 64.4 | — | 26.3 |
| Example-4 | 1,502 | 2,006 | 215 | 63.0 | — | 33.9 |
| Example-5 | 1,444 | 1,494 | 215.6 | 70.9 | 243.5 | 11.4 |
| Comparative Example-1 | 1,592 | 2,025 | 219 | 45.6 | 232.8 | 35.1 |
| Comparative Example-2 | 819 | 1,348 | 219 | 60.9 | 236.5 | 16.2 |

Manufacturing Example

Manufacturing of Cells

Slurries were prepared by mixing the positive electrode active materials for the lithium secondary batteries prepared according to Examples and Comparative Examples respectively, artificial graphite as a conductive material, and polyvinylidene fluoride (PVdF) as a binding material at a weight ratio of 85:10:5. Positive electrodes for the lithium secondary batteries were produced by uniformly applying the slurries onto an aluminum foil with a thickness of 15 μm and vacuum drying the slurries applied onto the aluminum foil at 135° C.

Coin cells were manufactured in an ordinary manner using the positive electrodes and a lithium foil as a counter electrode, a porous polypropylene membrane with a thickness of 20 μm as a separator, and an electrolyte obtained by dissolving $LiPF_6$ at a concentration of 1.15 M in a solvent in which ethylene carbonate, diethyl carbonate and ethyl methyl carbonate were mixed at a volume ratio of 3:1:6.

Experimental Example

Evaluation of Charge and Discharge Characteristics

Figure 5:
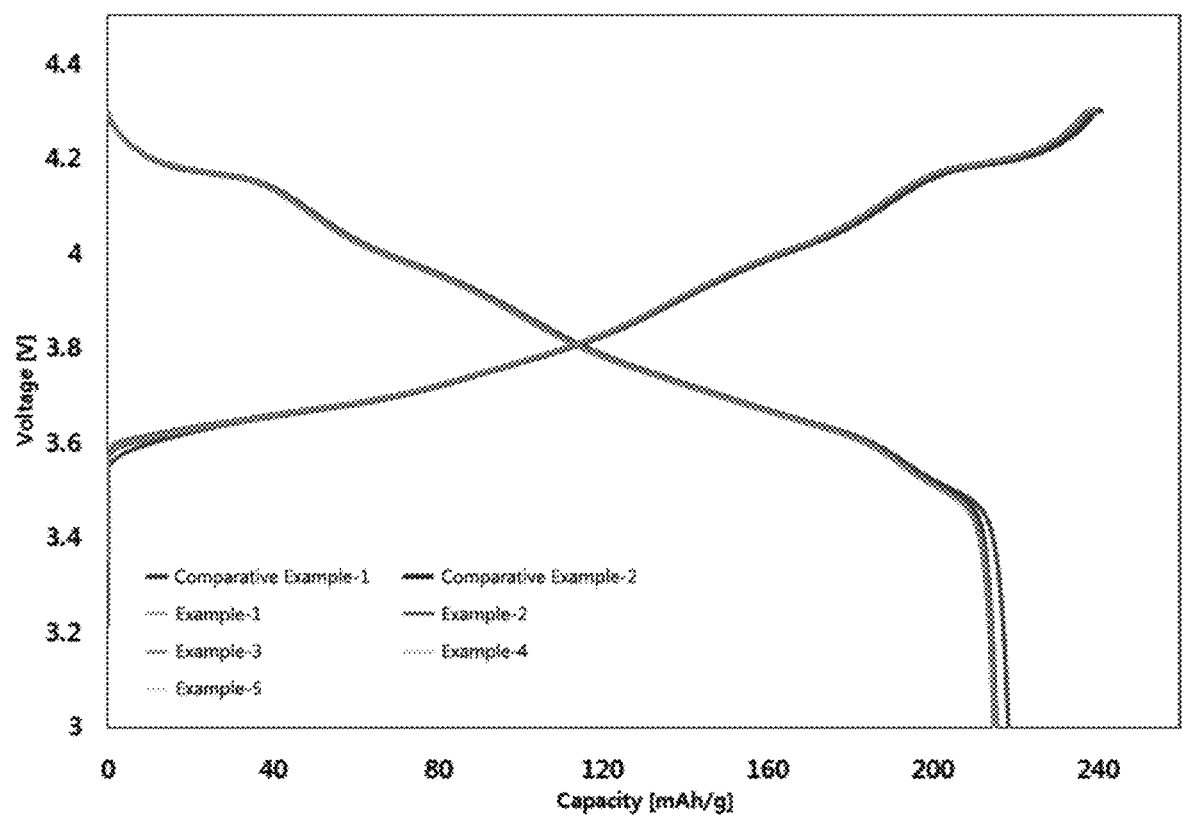
FIG. 5 shows results of measuring charge and discharge characteristics of batteries including active materials prepared in Examples and Comparative Examples of the present invention.

Charge and discharge characteristics of the cells manufactured in Manufacturing Example were measured, and measurement results are shown in Table 2 and FIG. 5.

Experimental Example

Measurement Results of C-Rates

Figure 6:
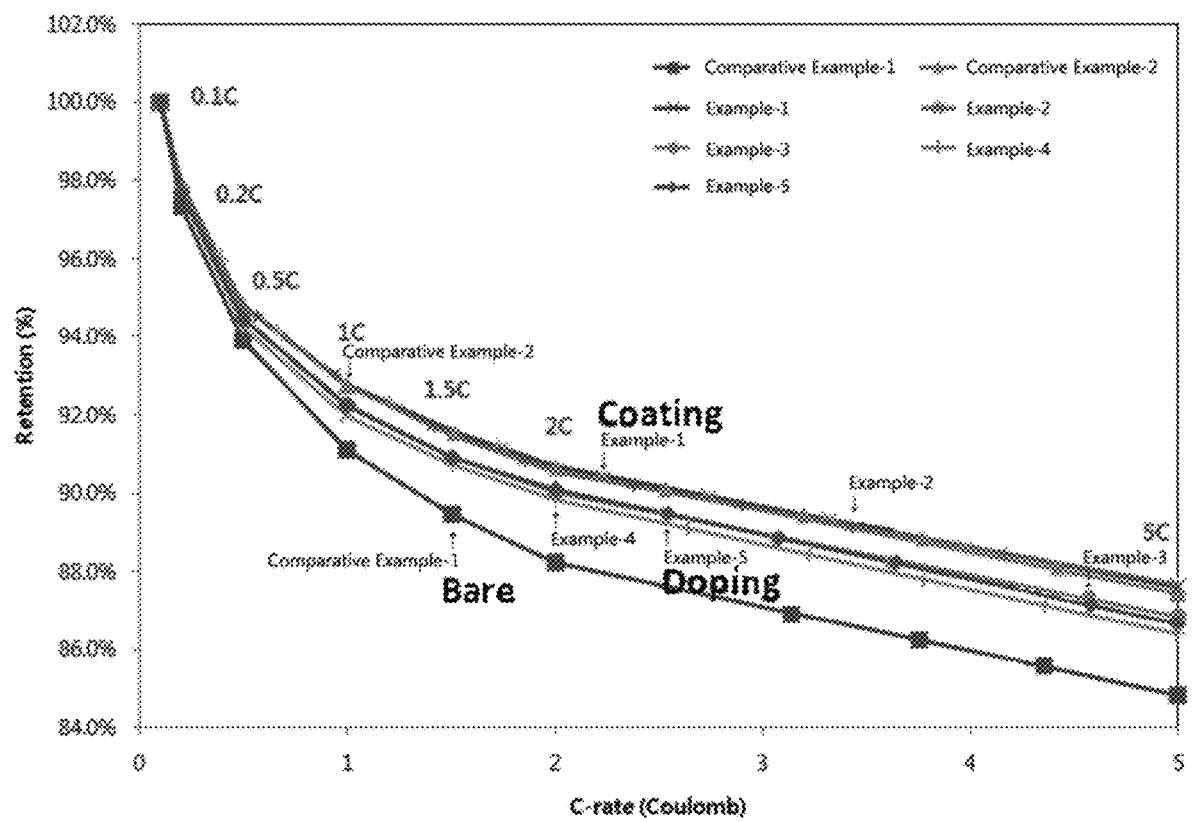
FIG. 6 shows results of measuring C-rates of batteries including active materials prepared in Examples and Comparative Examples of the present invention.

C-rates of coin cells including the positive electrode active materials of Examples and Comparative Examples were measured, and measurement results are shown in Table 2 and FIG. 6.

It can be confirmed that the C-rates are greatly improved in Examples of the present invention of doping cerium compared to Comparative Example-1 of doping Mg only.

Experimental Example

Measurement of Lifetime Characteristics

Figure 7:
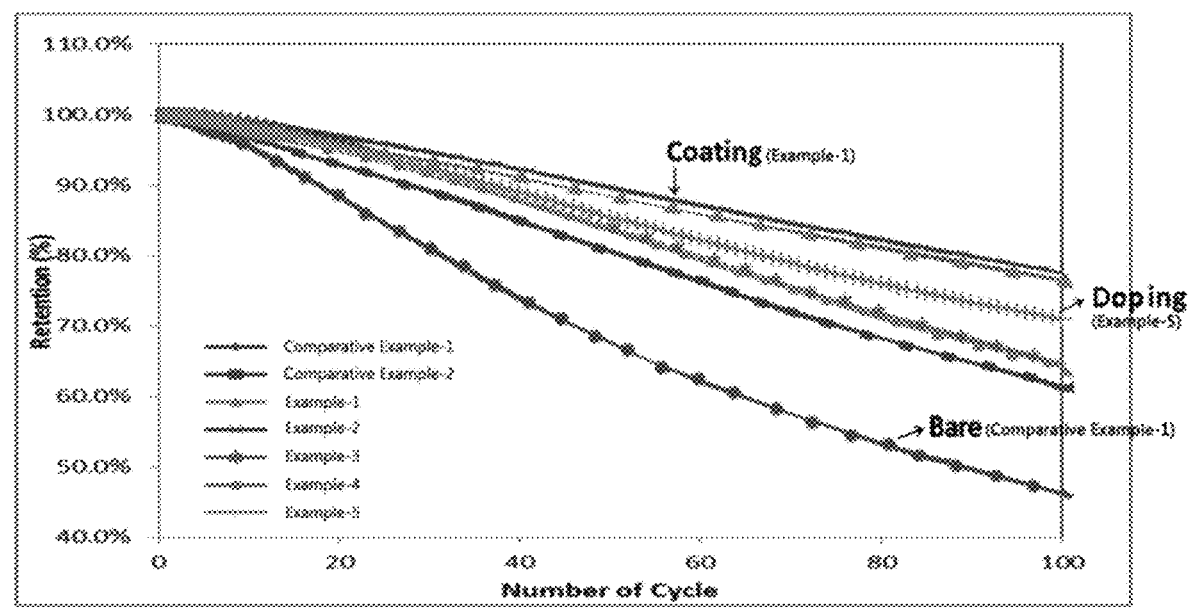
FIG. 7 shows results of measuring lifetime characteristics of batteries including active materials prepared in Examples and Comparative Examples of the present invention.

Lifetime characteristics of the coin cells including the positive electrode active materials of Examples and Comparative Examples were measured, and measurement results are shown in Table 2 and FIG. 7.

It can be confirmed that the lifetime characteristics are greatly improved in Example 1 in which the heat-treated cerium oxide was introduced during coating after heat-treating a cerium oxide compared to Comparative Example-1 in which cerium was not introduced.

Experimental Example 5

Measurement Results of Storage Stability-Impedance

Figure 8A:
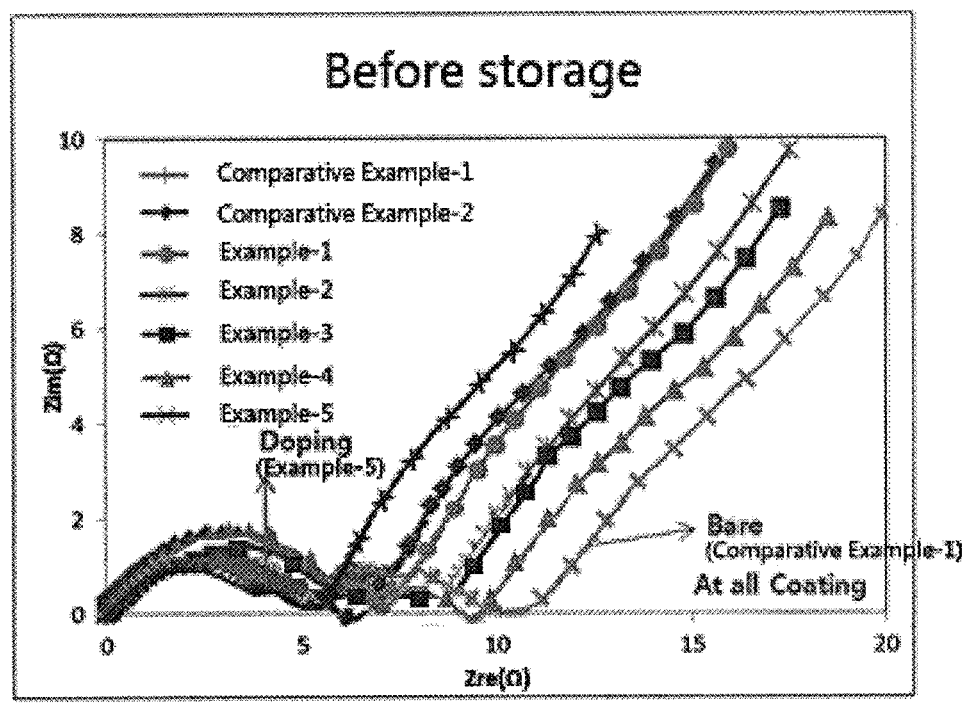
FIGS. 8(a) to 8(b) show results of measuring impedance characteristics before and after high temperature storage of batteries including active materials prepared in Examples and Comparative Examples of the present invention.
Figure 8B:
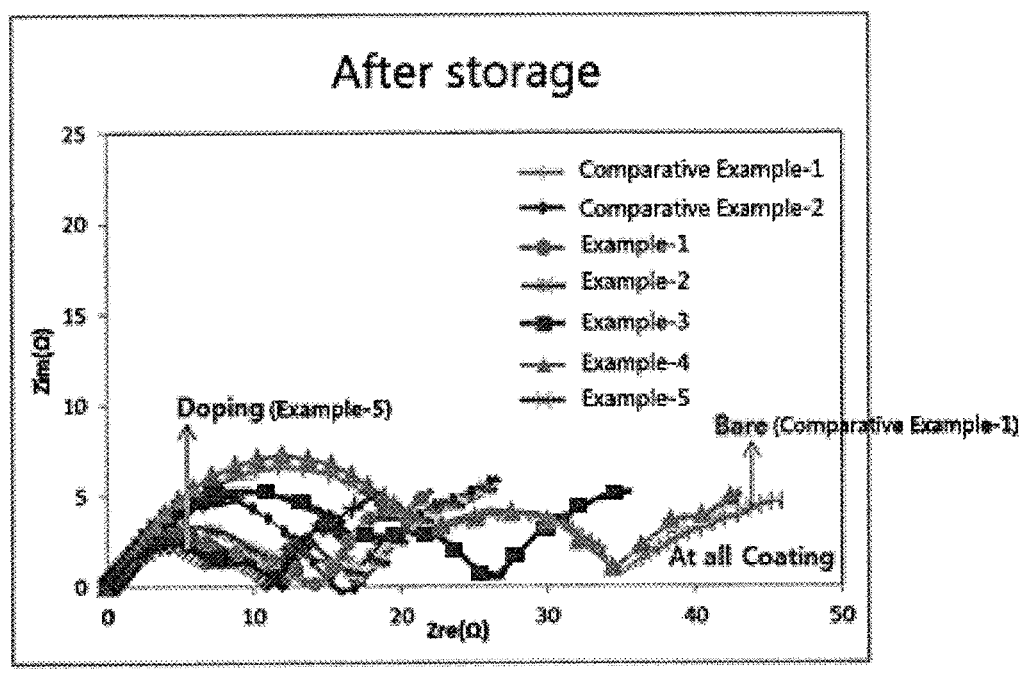

After storing the cells including the active materials of Examples and Comparative Examples at a high temperature of 60° C. for 7 days, impedance variations of the cells before and after storage were measured, and measurement results are shown in Table 2 and FIGS. 8(*a*) and 8(*b*).

It can be seen from Table 2 and FIGS. 8(*a*) to 8(*b*) that the cell including the positive electrode active material of Example 5 of doping cerium along with a lithium source by the present invention not only has a small impedance value measured before storage, but also has the smallest impedance increment after storage.

Experimental Example

Measurement of Thermal Stabilities

Figure 9:
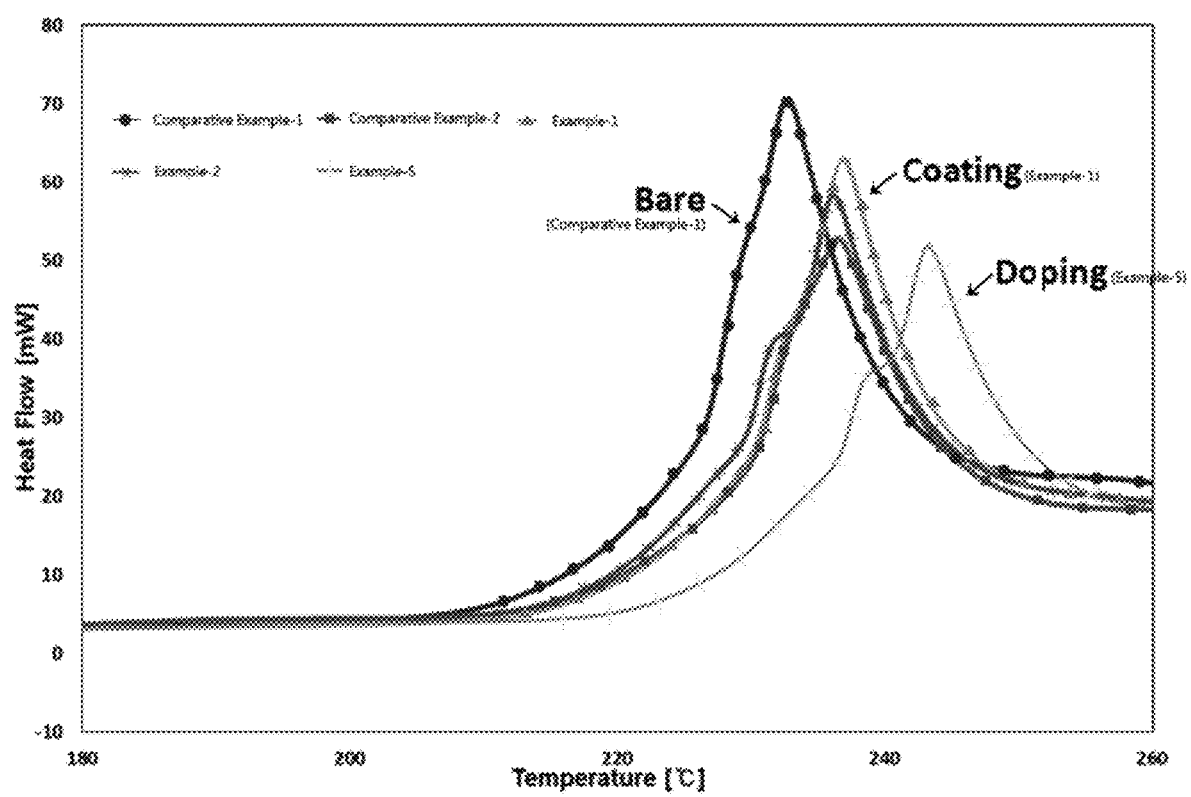
FIG. 9 shows results of measuring thermal stabilities of batteries including active materials prepared in Examples and Comparative Examples of the present invention.

In order to evaluate thermal stabilities of the cells including the active materials of Examples and Comparative Examples, differential scanning calorimetry (DSC) peak temperatures were measured, and measurement results are shown in Table 2 and FIG. 9.

It can be confirmed in FIG. 9 that the cell including the positive electrode active material of Example 5 of doping a cerium oxide along with the lithium source has a higher peak temperature than the positive electrode active material of Comparative Example 1 which is not doped or coated with a cerium oxide, thereby exhibiting excellent thermal stability. It was confirmed that the positive electrode active material of Example 1 of introducing the heat-treated cerium oxide during coating after heat-treating the cerium oxide shows excellent thermal stability.

A method of preparing a positive electrode active material for a lithium secondary battery of the present invention comprises making a lithium compound to react with a precursor to obtain a reaction product, washing the surface of the reaction product, additionally doping the washed reaction product with a metal oxide, and heat-treating the reaction product doped with the metal oxide such that the reaction product is doped with the metal oxide along with a lithium source, or an active material is prepared to enable the metal oxide to be coated on the surface of the active material. Therefore, the positive electrode active material for the lithium secondary battery prepared by the method of preparing the positive electrode active material for the lithium secondary battery of the present invention shows high capacity characteristics while reducing the amount of an unreacted lithium in the surface of the positive electrode active material.

What is claimed is:

1. A method of producing a lithium nickel composite oxide represented by following chemical formula 2, the method comprising the steps of:
   i) producing a nickel composite hydroxide represented by following chemical formula 1;

$Ni_{1-x-y}M1_xM2_y(OH)_2$,    [Chemical Formula 1]

wherein M1 is one or more elements selected from the group consisting of Co and Mn, M2 is one or more elements selected from the group consisting of Al, Mn, Mg, Si, P, and Ga, and $0<x\le0.03$, and $0<y\le0.03$;
   ii) washing the compound obtained in the step i) by adding the compound to a washing solution;
   iii) drying the compound washed in the step ii);
   iv) mixing the compound dried in the step iii) with LiOH, $Al_2O_3$, $Mg(OH)_2$, and $CeO_2$; and v)
   heating the compound mixed in the step iv); whereby a lithium nickel composite oxide represented by [Chemical Formula 2] $Li_{1+a}Ni_{1-x-y}M1_xM2_yM3_zO_2$ is produced;
   wherein in Chemical Formula 2, M1 is one or more elements selected from the group consisting of Co and Mn, M2 is one or more elements selected from the group consisting of Al, Mn, Mg, Si, P, and Ga; M3 represents individually Al, Mg, and Ce such that Al, Mg, and Ce are all present in the composite oxide; and wherein $0\le a\le0.3$, $0<x\le0.03$, $0<y\le0.03$, and $0<z\le0.03$.

2. The method of claim 1, wherein the washing solution of the step ii) includes one or more selected from the group consisting of distilled water, methanol, ethanol, 2-propanol, 1-butanol, ethylene glycol, polyvinyl alcohol (PVA), acetone, acetyl acetone, benzophenone, NaOH, $NH_4OH$, LiOH, KOH, $Mg(OH)_2$, and $Ba(OH)_2$.

3. The method of claim 1, wherein the step iii) of drying the compound washed in the step ii) includes drying the washed compound at 50 to 300° C. in a depressurized atmosphere.

4. The method of claim 1, wherein the $CeO_2$ has a particle diameter of 5 μm or smaller than 5 μm in the step iv).

5. The method of claim 1, in the step iv), wherein 0.001 to 10 parts by weight of all the $Al_2O_3$, $Mg(OH)_2$, and $CeO_2$ is mixed with 100 parts by weight of the compound dried in the step iii).

6. The method of claim 1, further comprising a step (vi) of washing the compound heated in the step v) by adding to a washing solution.

7. The method of claim 6, wherein the washing solution in the step vi) includes one or more selected from the group consisting of distilled water, methanol, ethanol, 2-propanol, 1-butanol, ethylene glycol, polyvinyl alcohol (PVA), acetone, acetyl acetone, benzophenone, NaOH, $NH_4OH$, LiOH, KOH, $Mg(OH)_2$, and $Ba(OH)_2$.

8. A lithium nickel composite oxide produced by claim 1.

9. The method of claim 1, further comprising:
   a step of mixing the lithium nickel composite oxide represented by the chemical formula 2 with a surface coating metal oxide including M4, wherein M4 is one or more elements selected from the group consisting of Al, Ba, Mg, Ce, Cr, Li, Mo, Sr, Ti, and Zr; and
   a step of heating the mixed lithium nickel composite oxide represented by the Chemical Formula 2 and surface coating metal oxide.

10. The method of claim 9, wherein the surface coating metal oxide including M4 has a particle diameter of 5 μm or less.

11. The method of claim 9, wherein the surface coating metal oxide including M4 is $CeO_2$.

12. A lithium nickel composite oxide produced by the method of claim 9.

13. The lithium nickel composite oxide of claim 12, wherein the lithium nickel composite oxide has peaks which are detected within 2θ ranges of 28° to 29°, 45° to 50° and 55° to 60° in an X-ray diffraction (XRD) measurement.

* * * * *